(12) United States Patent
Kumar et al.

(10) Patent No.: US 11,743,971 B2
(45) Date of Patent: *Aug. 29, 2023

(54) METHOD AND SYSTEM FOR MAINTAINING SERVICE CONTINUITY BY USER EQUIPMENT (UE) IN WIRELESS COMMUNICATION SYSTEM

(71) Applicant: Samsung Electronics Co., Ltd., Gyeonggi-do (KR)

(72) Inventors: Lalith Kumar, Bangalore (IN); Danish Ehsan Hashmi, Bangalore (IN); Kailash Kumar Jha, Bangalore (IN); Alok Kumar Jangid, Bangalore (IN); Govind Irappa Uttur, Bangalore (IN)

(73) Assignee: Samsung Electronics Co., Ltd

( * ) Notice: Subject to any disclaimer, the term of this patent is extended or adjusted under 35 U.S.C. 154(b) by 33 days.

This patent is subject to a terminal disclaimer.

(21) Appl. No.: 17/403,281

(22) Filed: Aug. 16, 2021

(65) Prior Publication Data

US 2021/0378056 A1 Dec. 2, 2021

Related U.S. Application Data

(63) Continuation of application No. 16/622,725, filed as application No. PCT/KR2018/012121 on Oct. 15, 2018, now Pat. No. 11,096,245.

(30) Foreign Application Priority Data

Oct. 13, 2017 (IN) .............................. 201741036546
Oct. 12, 2018 (IN) .............................. 201842038766

(51) Int. Cl.
*H04W 88/06* (2009.01)
*H04W 36/00* (2009.01)
(Continued)

(52) U.S. Cl.
CPC ....... *H04W 88/06* (2013.01); *H04W 36/0022* (2013.01); *H04W 36/14* (2013.01); *H04W 48/18* (2013.01); *H04W 60/005* (2013.01)

(58) Field of Classification Search
CPC . H04W 88/06; H04W 36/0022; H04W 36/14; H04W 48/18; H04W 60/005; H04W 60/04
See application file for complete search history.

(56) References Cited

U.S. PATENT DOCUMENTS 8,369,253 B2   2/2013  Faccin et al.
9,047,648 B1 *  6/2015  Lekutai .................. G16H 40/40
(Continued)

FOREIGN PATENT DOCUMENTS

CN   102860090   1/2013
CN   102870479   1/2013
(Continued)

OTHER PUBLICATIONS

PCT/ISA/210 Search Report issued on PCT/KR2018/012121, pp. 3.
(Continued)

*Primary Examiner* — Julio R Perez
(74) *Attorney, Agent, or Firm* — The Farrell Law Firm, P.C.

(57) ABSTRACT

Embodiments herein provide a method for maintaining service continuity by a User Equipment (UE) in a wireless communication system. The method includes transmitting a registration request message or a tracking area update (TAU) message to a management entity of a first radio access technology (RAT) network, when the UE is registered in the first RAT network and a second RAT network; receiving, from the management entity, a registration reject message or a TAU reject message; and transmitting, to the management entity, a registration message for initial registration or an (Continued)

attach request message including a registration status information of the UE of the second RAT network.

16 Claims, 12 Drawing Sheets

(51) Int. Cl.
*H04W 36/14* (2009.01)
*H04W 48/18* (2009.01)
*H04W 60/00* (2009.01)

(56) References Cited

U.S. PATENT DOCUMENTS

| | | | | |
|---|---|---|---|---|
| 2010/0048160 | A1* | 2/2010 | Lekutai | H04W 76/50 455/404.1 |
| 2010/0317317 | A1* | 12/2010 | Maier | H04W 4/029 455/404.2 |
| 2011/0019587 | A1* | 1/2011 | Wang | H04L 63/08 370/254 |
| 2014/0206352 | A1 | 7/2014 | Mochizuki et al. | |
| 2015/0312739 | A1* | 10/2015 | Burt | H04W 4/90 455/404.1 |
| 2016/0128020 | A1* | 5/2016 | Agarwal | H04W 68/04 370/328 |
| 2017/0278378 | A1* | 9/2017 | Kaplita | G08B 25/005 |
| 2018/0310190 | A1* | 10/2018 | Dash | H04W 36/0022 |
| 2019/0053054 | A1* | 2/2019 | Seshadri | H04W 60/00 |
| 2019/0075578 | A1 | 3/2019 | Kim | |
| 2019/0174449 | A1* | 6/2019 | Shan | H04W 60/00 |
| 2019/0182718 | A1 | 6/2019 | Shan | |
| 2019/0230556 | A1* | 7/2019 | Lee | H04W 28/16 |
| 2019/0306899 | A1* | 10/2019 | Kuge | H04W 8/02 |
| 2019/0335532 | A1* | 10/2019 | Kim | H04W 72/12 |
| 2019/0357116 | A1* | 11/2019 | Huang-Fu | H04W 48/02 |
| 2020/0068481 | A1* | 2/2020 | Kim | H04W 8/08 |
| 2020/0077250 | A1* | 3/2020 | Gideon, III | G06Q 30/0205 |
| 2020/0153796 | A1* | 5/2020 | Lin | H04W 4/38 |
| 2020/0187150 | A1* | 6/2020 | Eisner | H04W 76/50 |
| 2020/0252780 | A1* | 8/2020 | McClendon, IV | H04W 4/90 |
| 2020/0275506 | A1* | 8/2020 | Niemi | H04W 76/11 |
| 2020/0336964 | A1* | 10/2020 | Kawasaki | H04W 76/18 |
| 2020/0359348 | A1* | 11/2020 | Kumar | H04W 12/06 |
| 2020/0367153 | A1* | 11/2020 | Sen | H04W 60/005 |
| 2021/0084443 | A1 | 3/2021 | Wang et al. | |

FOREIGN PATENT DOCUMENTS

| | | |
|---|---|---|
| CN | 105659634 | 6/2016 |
| CN | 106549806 | 3/2017 |
| CN | 106982458 | 7/2017 |
| EP | 3 654 692 | 5/2020 |
| KR | 1020170106624 | 9/2017 |
| WO | WO 2017/080517 | 5/2017 |
| WO | WO 2017/143047 | 8/2017 |
| WO | WO 2017/147271 | 8/2017 |
| WO | WO 2017/171348 | 10/2017 |
| WO | WO 2018/034924 | 2/2018 |

OTHER PUBLICATIONS

PCT/ISA/237 Written Opinion issued on PCT/KR2018/012121, pp. 5.
PCT/ISA/210 Search Report issued on PCT/KR2018/012123, pp. 5.
PCT/ISA/237 Written Opinion issued on PCT/KR2018/012123, pp. 9.
Samsung, 3GPP SA WG2 Meeting #122bis, S2-175774, Aug. 15, 2017, Sophia Antipolis, France, "TS 23.501: Rejected Slices", pp. 6.
Samsung, 3GPP SA WG2 Meeting #122, S2-174666, Jun. 20, 2017, San Jose Del Cabo, Mexico, "Several corrections to clause on Registration to a Set of Network Slices", pp. 5.
Samsung, Verizon, 3GPP SA WG2 Meeting #122, S2-174688, Jun. 20, 2017, San Jose del Cabo, Mexico, "5GC-EPC Interworking for a dual-registration UE", pp. 4.
Samsung, Verizon, SK Telecom, 3GPP SA WG2 Meeting #122, S2-17xxxx, Jun. 20, 2017, "Interworking procedure for a dual-registration UE: 5GC to EPC mobility", pp. 6.
3GPP 5G ETSI TS 124 501 V15.0.0 (Jul. 2018), 5G: Non-Access-Stratum (NAS) protocol for 5G System (5GS); Stage 3; Release 15, pp. 338.
3GPP TS 23.501 V1.4.0 (Sep. 28, 2017), 3rd Generation Partnership Project; Technical Specification Group Services and System Aspects; System Architecture for the 5G System; Stage 2 (Release 15), pp. 154.
3GPP TS 23.502 V1.2.0 (Sep. 22, 2017), 3rd Generation Partnership Project; Technical Specification Group Services and System Aspects; Procedures for the 5G System; Stage 2 (Release 15), pp. 168.
Huawei, HiSilicon, "UE Slice Association/Overload Control Procedure", S2-162981, 3GPP TSG SA WG2 Meeting #115, May 23-27, 2016, 8 pages.
European Search Report dated May 21, 2021 issued in counterpart application No. 18866020.3-1212, 10 pages.
NTT Docomo, "No-N26 Interworking Procedures", S2-175739, SA WG2 Meeting #122bis, Aug. 21-25, 2017, 13 pages.
NTT Docomo, "No-Nx Interworking Procedures", S2-175156, SA WG2 Meeting #122, Jun. 26-30, 2017, 12 pages.
NTT Docomo, "Interworking Between NGC and EPC", S2-170934, XP051217054, Feb. 13, 2017, 22 pages.
European Search Report dated Jul. 30, 2020 issued in counterpart application No. 18865779.5-1212, 10 pages.
European Search Report dated Nov. 24, 2022 issued in counterpart application No. 18866020.3-1216, 4 pages.
Intel, "Avoidance of TAU Failure in Interworking without N26 Interface for SR-Mode UE", S2-175886, SA WG2 Meeting #122bis, Aug. 21-25, 2017, 3 pages.
Chinese Office Action dated Dec. 3, 2021 issued in counterpart application No. 201880038761.2, 19 pages.
Chinese Office Action dated Feb. 27, 2023 issued in counterpart application No. 201880078274.9, 12 pages.
EP Intention to Grant dated Feb. 7, 2023 issued in counterpart application No. 18865779.5-1216, 46 pages.

* cited by examiner

METHOD AND SYSTEM FOR MAINTAINING SERVICE CONTINUITY BY USER EQUIPMENT (UE) IN WIRELESS COMMUNICATION SYSTEM

PRIORITY

This application is a Continuation of U.S. application Ser. No. 16/622,725, which was filed in the U.S. Patent and Trademark Office on Dec. 13, 2019, which a National Phase Entry of PCT International Application No. PCT/KR2018/012121, which was filed on Oct. 15, 2018, and claims priority to Indian Patent Application Nos. 201741036546 and 201842038766, which were filed on Oct. 13, 2017, and Oct. 12, 2018, respectively, the entire content of each of which is incorporated herein by reference.

BACKGROUND

1. Field

The embodiment herein relates to a wireless communication system, and more particularly relates to a method and system for maintaining service continuity by a User Equipment (UE) in the wireless communication system.

2. Description of the Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), etc., have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The principal object of the embodiments herein is to provide a method and system for maintaining service continuity by a UE in a wireless communication system.

Another object of the embodiments herein is to detect a change in location during a mobility of the UE from a first radio access technology to a second radio access technology.

Another object of the embodiments herein is to initiate an attach request procedure with other registered RAT information for maintaining the service continuity.

Another object of the embodiments herein is to operate the UE in a dual registration even a registration accept message indicates the UE to support the single registration.

Accordingly the embodiments herein provide a method for maintaining service continuity by a UE in a wireless communication system. The method includes detecting, by the UE, a change in location during mobility of the UE from a first registration or tracking area to another registration or tracking area within a first Radio Access Technology, wherein the UE is registered in core networks of two different radio access technology (Dual Registration). Further, the method includes triggering, by the UE, a tracking area update (TAU) or a mobility registration procedure in the first Radio Access Technology on detecting the change in the location. Further, the method includes receiving, by the UE, a registration reject or TAU reject from the core network on the first radio access technology. Furthermore, the method includes initiating, by the UE, an attach request or registration request procedure by transmitting an attach request or initial registration request message in response to receiving the receiving the registration reject or TAU reject, wherein the initial attach request or initial registration request message comprising a registration status of the UE of a second Radio access technology to a core network of the first Radio Access Technology (RAT).

In an embodiment, the first radio access technology and second radio access technology include at least one of a 3rd Generation Partnership Project (3GPP) Long Term Evolution (LTE) RAT and a 3GPP New Radio (NR) RAT.

In an embodiment, the registered status of the second RAT comprises of the UE status IE which indicates if UE is registered with 4G network (with indication of UE is in EMM-REGISTERED state) or not registered with 4G network (with indication of UE is not in EMM-REGISTERED state) when the UE is registering with AMF. If the UE registering with a Mobility Management Entity (MME) the other registered RAT registration status comprises of the UE status IE which indicates if UE is registered with 5G network (with indication of UE is in 5GMM-REGISTERED state) or not registered with 5G network (with indication of UE is not in 5GMM-REGISTERED state).

In an embodiment, the service continuity to the UE is maintained by retaining the other registered RAT information of the UE at the Core Network associated with the second radio access technology.

Accordingly the embodiments herein provide a method for handling dual registration of a User Equipment (UE) in a wireless communication system. The method includes determining that the UE supports dual registration on different RATs when Nx (N26) interface is available between AMF and MME. Further, the method includes receiving a registration accept message from an Access and Mobility Management Function (AMF) entity, wherein the registration accept message indicates the UE to support a single registration. Furthermore, the method includes operating the UE in the dual registration even though registration accept message indicates the UE to operate in the single registration mode.

Accordingly the embodiments herein provide a UE for maintaining a service continuity in a wireless communication system. The UE includes a service continuity controller operably coupled with a memory and a processor. The service continuity controller is configured to detect a change in location during a mobility of the UE from a first registration or tracking area to another registration or tracking area within a first Radio Access Technology, wherein the UE is registered in core networks of two different radio access technology (Dual Registration). The service continuity controller is configured to trigger a TAU or a mobility registration procedure in the first Radio Access Technology, in response to receiving a registration reject or TAU reject from the core network on the first radio access technology. Further, the service continuity controller is configured to initiate an attach request or registration request procedure by transmitting an attach request or initial registration request message, wherein the initial attach request or initial registration request message comprising a registration status of the UE of a second Radio access technology to a core network of the first RAT.

Accordingly the embodiments herein provide a UE for handling dual registration in a wireless communication system. The UE includes a registration engine operably coupled with a memory and a processor. The registration engine is configured to determine that the UE supports dual registration on different RATs when Nx (N26) interface is available. Further, the registration engine is configured to receive a registration accept message from an AMF entity, wherein the registration accept message indicates the UE to operate in a single registration mode. Furthermore, the registration engine is configured to operate the UE in the dual registration mode even though registration accept message indicates the UE to operate in the single registration mode.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
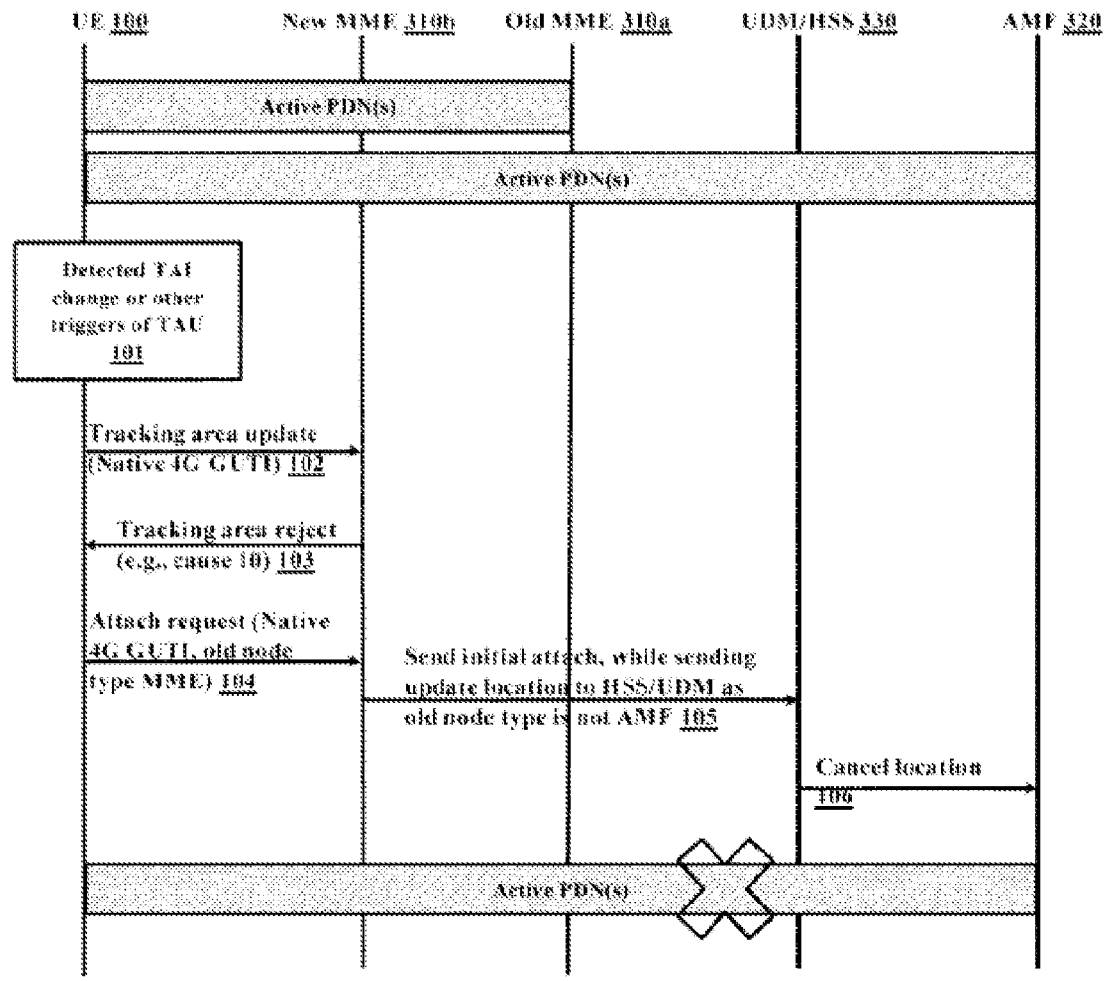
FIG. 1A is a sequence diagram illustrating a method of receiving a TAU failure message (e.g., temporary rejection) from the MME during mobility from one tracking area to another tracking area, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, storage circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Wireless communication systems are widely deployed to provide various types of communication content such as voice, video, packet data, messaging, broadcast, or the like. In the wireless communication system, for a dual-mode or a multi-mode registration, a UE includes dual or multiple radio transceivers, each configured to communicate on a particular RAT, such as 3$^{rd}$ Generation Partnership Project (3GPP) access systems such as 4G system and 5G system and non-3GPP access systems. However, in current systems, UE can maintain some Packet Data Networks (PDNs) in 4G RAT and some Protocol Data Units (PDUs) in 5G RAT. Further, during location change of the UE during mobility from one tracking area to another tracking area in active RAT (4G or 5G), UE initiates TAU or registration request procedure. In such scenario, if UE receives the temporary network reject from the network, Initial Attach Request or Initial Registration request is initiated by the UE in active RAT, which triggers core network of the active RAT to initiate location update to the Home Subscriber Server (HSS)/Unified Data Management (UDM). Due to this location update procedure to HSS/UDM, PDUs active for UE on alternate RATs are deactivated causing data loss for the UE.

FIG. 1A is a sequence diagram illustrating a method of receiving a registration failure message (e.g., temporary rejection) from the MME during registration, according to a prior art.

As shown in the FIG. 1A, consider another scenario that the UE 100 is registered in the dual-mode registration, in which the UE 100 can access the 3GPP access network (such as 4G) using an old MME 310*a*. If the UE 100 moves to a new tracking area within a 4G coverage area then, the UE 100 detects changes in the tracking area at UE at step 101. Further, at step 102, the UE 100 can send a TAU attach request with a new MME 310*b*. However, the new MME 310*b* can send a tracking area reject/implicit detach to the UE 100 at step 103. As the 4G identity is still valid, the UE 100 may send an attach request with a native 4G Globally Unique Temporary Identifier (GUTI) details to the new MME 310*b* at step 104. As the UE 100 does not includes that the old MME 310*a* as the AMF 320 in the attach request, the new MME 310*b* may send the update location to Home Subscriber Server/User Data Model (HSS/UDM) 330 with an initial attach flag set at step 105. Further, the HSS/UDM 330 can delete all the context from the UE 100 by sending cancel location to the AMF 320, even the PDU in the 5G RAT network remains active at step 106. This results in a loss of connection due to switching from one tracking area to another tracking area.

Currently, dual registration is given by the network in the 5G in registration accept if the N26 interface is not supported by the network. However there can be some devices which supports dual radio which may want to use the dual registration to support different PDU on different RAT. Current Standard doesn't provide the provision for the UE 100 to take the decision whether it wants to support the dual registration over single registration even if N26 interface is there.

Figure 1B:
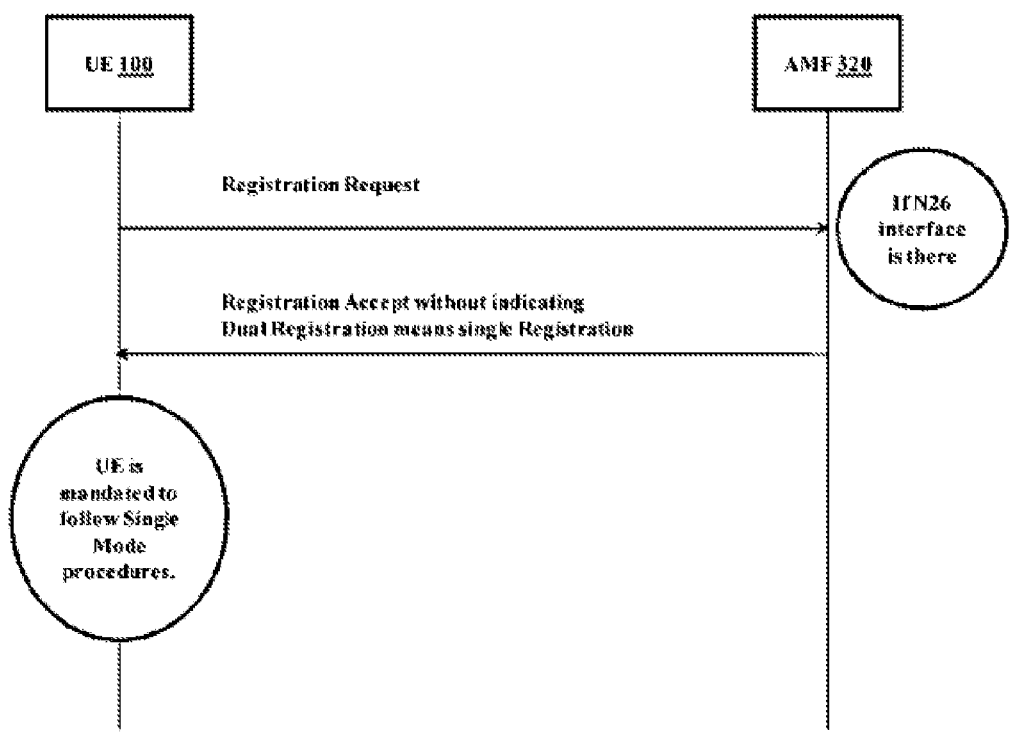
FIG. 1B is a scenario of registration accept without indicating dual registration, according to prior art.

As shown in the FIG. 1B, at 1, the UE 100 sends the registration request to the AMF 320. If N26 interface is there and the AMF 320 sends the registration accept without indicating dual registration to the UE 100 and the UE 100 is mandated to follow single mode procedures at 2.

Thus, it is desired to address the above mentioned disadvantages or other shortcomings or at least provide a useful alternative.

Embodiments herein provide a method for maintaining service continuity by a User Equipment (UE) in a wireless communication system. The method includes detecting, by the UE, a change in location during mobility of the UE from a first registration or tracking area to another registration or tracking area within a first Radio Access Technology, wherein the UE is registered in core networks of two different radio access technology (Dual Registration). Further, the method includes triggering, by the UE, a TAU or a mobility registration procedure in the first Radio Access Technology on detecting the change in the location. Further, the method includes receiving, by the UE, a registration reject or TAU reject from the core network on the first radio access technology. Furthermore, the method includes initiating, by the UE, an attach request or registration request procedure by transmitting an attach request or initial registration request message in response to receiving the receiving the registration reject or TAU reject, wherein the initial attach request or initial registration request message comprising a registration status of the UE of a second Radio access technology to a core network of the first RAT.

Unlike conventional methods and systems, the proposed method can be used to avoid data loss for a UE operating in a dual registration mode. The proposed method allows the UE operating in a dual registration mode to send a tracking area request (TAR) or registration request, where the TAU or registration request includes that the information of UE is registered on a RAT (e.g., 4G 3GPP) and an alternate RAT (e.g., 5G-3GPP). Thus, the proposed method prevents cancellation of the context information of the UE in alternate RAT, when the UE switched from one tracking area to another tracking area in the active RAT.

In conventional methods, the dual registration capable UE sends the registration request with dual registration support indication set to an AMF. If N26 interface is supported at the network between AMF and MME, the AMF sends the registration accept without indicating dual registration mode to the UE and then UE is mandated to operate in a single registration mode.

Unlike to conventional method, the proposed method can be used to allow the UE to obviate mandated the use of single registration when the dual registration is not indicated to the UE. Further, the dual registration can be used with the dual radio supported UE in some specific cases even when the single registration is supported by the network.

Referring now to the drawings, and more particularly to FIG. 2 to FIG. 5, FIG. 6B to FIG. 7, and FIG. 8B, there are shown preferred embodiments.

Figure 2:
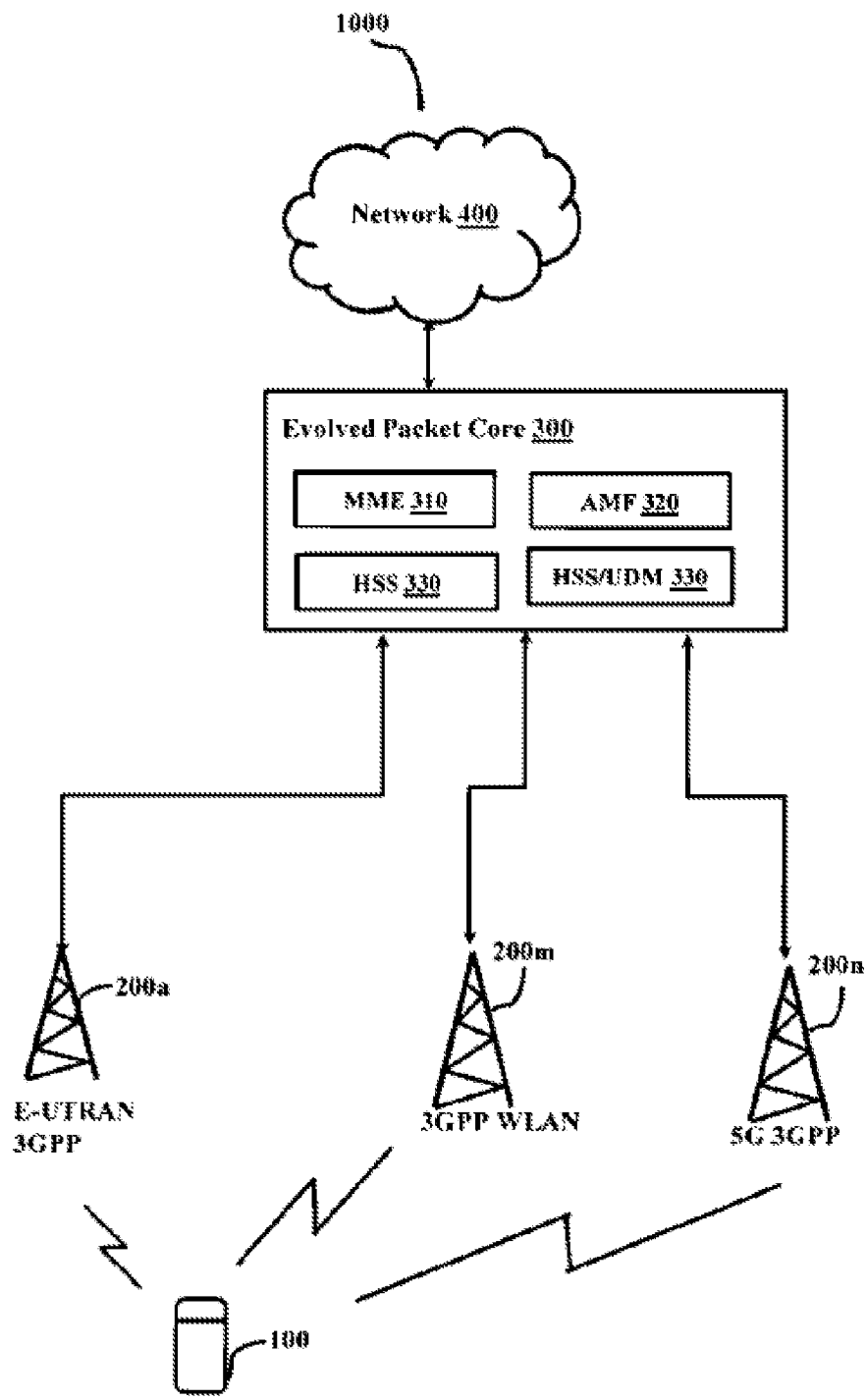
FIG. 2 is an architecture diagram of a wireless communication system, according to an embodiment as disclosed herein.

FIG. 2 is an architecture diagram of the wireless communication system 1000, according to an embodiment as disclosed herein. The wireless communication system 1000 includes a network 400, an Evolved Packet Core (EPC) 300, base station (200a-200c) and a UE 100. The network 400 can be a cellular network, for example a 3GPP Long Term Evolution (LTE) network such as an evolved universal terrestrial radio access technology (E-UTRAN), 4G, 5G. In another embodiment, the network 400 may be a Wireless Local Area Network (WLAN) such as an Institute of Electrical and Electronics Engineers (IEEE) 802.11 Wi-Fi network.

The UE 100 communicates with the network 400 for providing one or more data services to a user. In an example, the data service can be, for example, voice communication, text messaging, multimedia streaming, and Internet access. The UE 100 can be configured to access the network 400 via any one of 3GPP access network and a non-3GPP access network. The base station (200a-200c, hereinafter referred as 200) is a radio access network which allows the UE 100 to connect with the internet 400. The radio access network can be for example a 3GPP access network and a non-3GPP access network. The UE 100 can access the 3GPP access network via base station 200a and 200b. Likewise, the UE 100 can access the non-3GPP access network via base station 200c. The 3GPP access network can be for example an Evolved-Universal Mobile Telecommunications System (UMTS) Terrestrial Radio access technology (E-UTRAN). For the 3GPP access network, the access information is specified in 3GPP specifications.

The EPC 300 is referred as core network in the wireless communication system 1000. The EPC 300 may be referred to as 5G Core Network (CN), 5G Core (5GC), NextGen (NG) CN, NGC, and variations thereof may be used interchangeably throughout this disclosure. The EPC 300 includes a MIME 310, an AMF 320 and a HSS/UDM 330.

The MME 310 is configured to support an interworking procedure of the wireless communication system 1000. The MME 310 is configured to perform the signaling and control functions to support access to the network connection of the UE 100, assignment of network resources, paging, tracking, roaming and handover or the like. The MME 310 deals with the control plane functions related to subscriber and session management. Further, the MME manages a number of base stations, and performs the signaling for the selection of a conventional gateway for a handover to other 2G/3G network. The MME 310 handles the signaling related to mobility and security for E-UTRAN access. The MME 310 is responsible for the tracking and the paging of UE in idle-mode. The MME 310 is the termination point of the Non-Access Stratum (NAS).

The AMF 320 supports the following functions:
 a. Termination of NAS signaling,
 b. NAS ciphering & integrity protection,
 c. Registration management,
 d. Connection management,
 e. Mobility management,
 f. Access authentication and authorization, and
 g. Security context management.

In an embodiment, the AMF 320 has part of the MME functionality from EPC 300.

The HSS/UDM 330 is a database that contains all the user subscription information, including user identification information such as International Mobile Subscriber Identity (IMSI), Mobile Subscriber Integrated Services Digital Network (MSISDN) number, or mobile telephone number, and user profile information that includes service subscription states and user-subscribed Quality of Service (QoS) information. The HSS/UDM 330 may provide the authentication and security information for the UE 100.

In an embodiment, the UE 100 can access the network 400 using a single registration mode or a dual registration mode in the wireless communication system 1000.

Figure 3:
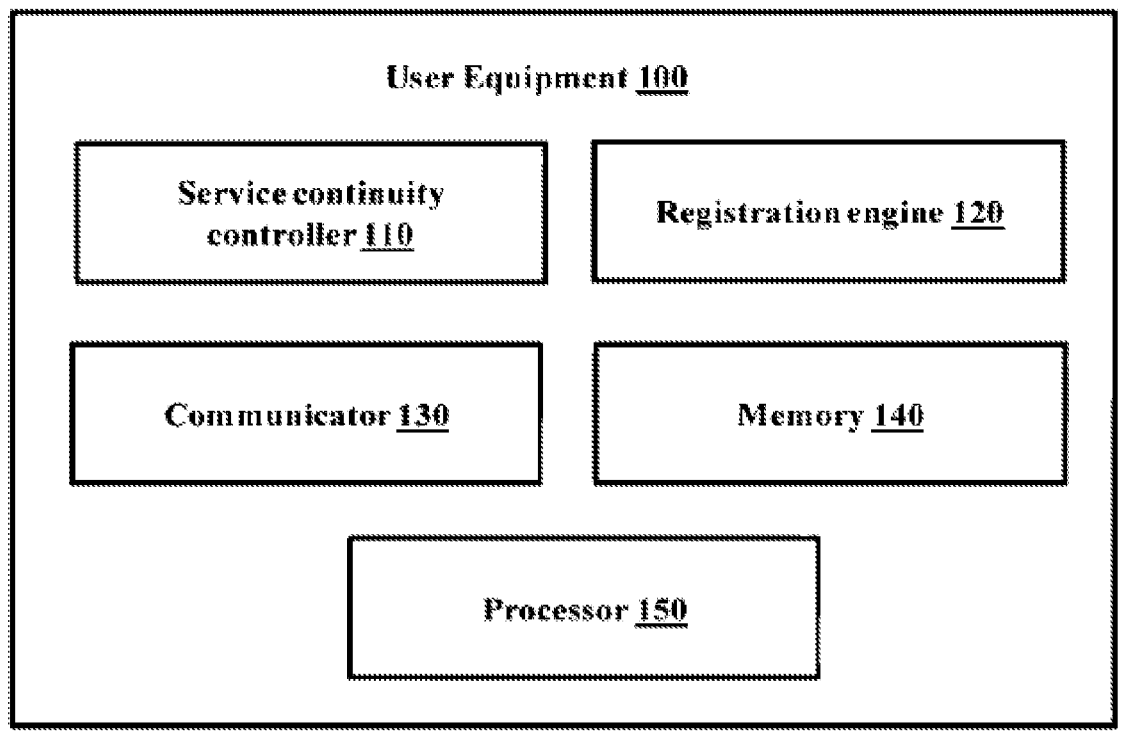
FIG. 3 is a block diagram of the UE for handling dual registration in the wireless communication system, according to an embodiment as disclosed herein.

FIG. 3 is a block diagram of the UE 100, according to an embodiment as disclosed herein.

Referring to FIG. 3, the UE 100 includes a service continuity controller 110, a registration engine 120, a communicator 130, a memory 140, and a processor 150. The UE 100 can be, for e.g., a cellular telephone, a smartphone, a personal computer (PC), a minicomputer, a desktop, a laptop, a handheld computer, Personal Digital Assistant (PDA), or the like. The UE 100 may support multiple RAT such as, for e.g., Code-division multiple access (CDMA), General Packet Radio Service (GPRS), Evolution-Data Optimized EVDO (EvDO), Time-division multiple access (TDMA), GSM (Global System for Mobile Communications), WiMAX (Worldwide Interoperability for Microwave Access) technology, LTE, LTE Advanced (LTE-A) and 5G communication technologies.

In an embodiment, the service continuity controller 110 detects a change in location during a mobility of the UE from a first registration or tracking area to another registration or tracking area within a first Radio Access Technology, wherein the UE 100 is registered in core networks of two different radio access technology (Dual Registration). Further, the service continuity controller 110 triggers a TAU or a mobility registration procedure in the first Radio Access Technology on detecting the change in the location. Further, the service continuity controller 110 receives a registration reject or TAU reject from the core network on the first radio access technology. Further, the service continuity controller 110 initiates an attach request or registration request procedure by transmitting an attach request or initial registration request message, wherein the initial attach request or initial registration request message comprising a registration status of the UE of a second Radio access technology to a core network of the first RAT.

In an embodiment, the service continuity controller 110 detects a change in location during a mobility from a first radio access network 200a to a second radio access network 200b. In an embodiment, within the first radio access network 200a, the UE 100 may move from one location to another location which causes the UE to switch from one RAT to another RAT in the first radio access network 200a itself.

In an embodiment, the service continuity controller 110 initiates an attach request procedure to the MME 310b. The service continuity controller 110 sends an attach request message includes other registered RAT information to an MME 310b associated with the second radio access network 200b. The other registered RAT information includes one or more radio access technology subscribed by the UE 100 for one or more services.

In an embodiment, the first radio access network 200a and the second radio access network 200b includes at least one of a 3rd Generation Partnership Project (3GPP) access network and a non-3GPP access network. The 3GPP access network is at least one of an LTE network and an NR network.

In an embodiment, the service continuity controller 110 maintains the service continuity by retaining the other registered RAT information of the UE 100 associated with the second radio access network 200b.

In an embodiment, the registration engine 120 is operably coupled with the memory 140 and the processor 150. The registration engine 120 is configured to determine that the UE 100 supports dual registration on different RATs when Nx (N26) interface is available. Further, the registration engine 120 is configured to receive a registration accept message from an AMF entity, wherein the registration accept message indicates the UE 100 to support a single registration. Furthermore, the registration engine 120 is configured to operate the UE 100 in the dual registration even the registration accept message indicates the UE 100 to support the single registration. Such as the registration engine 120 operates the UE 100 in the dual registration in response to receiving the registration accept message indicating the UE to support the single registration.

In an embodiment, the communicator 130 is configured to communicate internally between hardware components in the UE 100. In an embodiment, the processor 150 is configured to process various instructions stored in the memory 140 for handling the beam failure recovery in the wireless communication system.

The memory 140 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 140 may, in some examples, be considered a non-transitory storage medium. The term "non-transitory" may indicate that the storage medium is not embodied in a carrier wave or a propagated signal. However, the term "non-transitory" should not be interpreted that the memory 140 is non-movable. In some examples, the memory 140 can be configured to store larger amounts of information than the memory. In certain examples, a non-transitory storage medium may store data that can, over time, change (e.g., in Random Access Memory (RAM) or cache).

Although the FIG. 3 shows various hardware components of the UE 100 but it is to be understood that other embodiments are not limited thereon. In other embodiments, the UE 100 may include less or more number of components. Further, the labels or names of the components are used only for illustrative purpose and does not limit the scope of the invention. One or more components can be combined together to perform same or substantially similar function of maintaining the service continuity in the wireless communication system.

Figure 4:
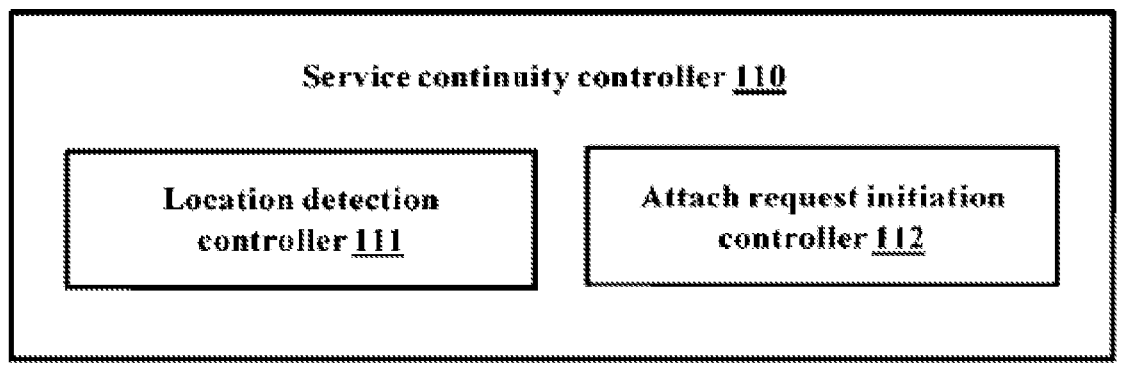
FIG. 4 is a block diagram of a service continuity controller of the UE, according to an embodiment as disclosed herein.

FIG. 4 is a block diagram of the service continuity controller 110 of the UE 100, according to an embodiment as disclosed herein. In an embodiment, the service continuity controller 110 includes a location detection controller 111 and an attach request initiation controller 112.

In an embodiment, the location detection controller 111 is configured to detect a change in the location during the mobility from the first radio access network 200a to the second radio access network 200b.

In an embodiment, the attach request initiation controller 112 is configured to initiate the attach request procedure to the MME 310b. The service continuity controller 110 sends an attach request message includes other registered RAT information to the MME 310b associated with the second radio access network 200b.

Figure 5:
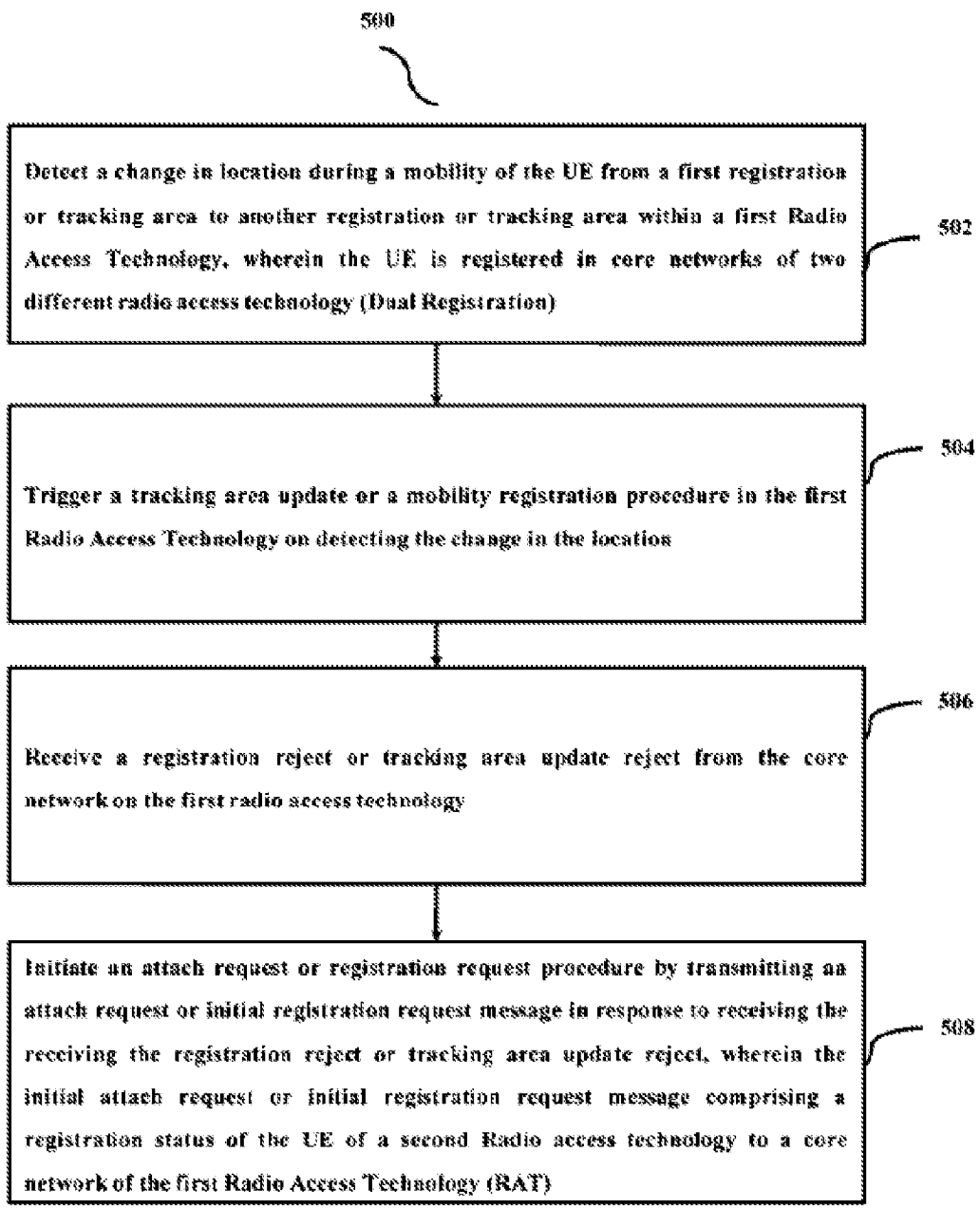
FIG. 5 is a flow diagram illustrating various operations for maintaining a service continuity by the UE in the wireless communication system, according to an embodiment as disclosed herein.

FIG. 5 is a flow diagram 500 illustrating various operations for maintaining the service continuity by the UE 100 in the wireless communication system 1000, according to an embodiment as disclosed herein.

At step 502, the method includes detecting, by the UE 100, the change in location during a mobility of the UE 100 from a first registration or tracking area to another registration or tracking area within a first Radio Access Technology, wherein the UE 100 is registered in core networks of two different radio access technology (Dual Registration). In an embodiment, the method allows the location detection controller 111 to detect the change in location during a mobility of the UE 100 from a first registration or tracking area to another registration or tracking area within a first Radio Access Technology, wherein the UE 100 is registered in core networks of two different radio access technology (Dual Registration).

At step 504, the method includes triggering, by the UE 100, a TAU or a mobility registration procedure in the first Radio Access Technology on detecting the change in the location. In an embodiment, the method allows the location detection controller 111 to trigger the TAU or a mobility registration procedure in the first Radio Access Technology on detecting the change in the location.

At step 506, the method includes receiving the registration reject or TAU reject from the core network on the first radio access technology. In an embodiment, the method allows the location detection controller 111 to receive the registration reject or TAU reject from the core network on the first radio access technology.

At step 508, the method includes initiating, by the UE 100, an attach request or registration request procedure by transmitting an attach request or initial registration request message, wherein the initial attach request or initial registration request message comprising a registration status of the UE 100 of a second Radio access technology to a core network of the first RAT. In an embodiment, the method allows the attach request initiation controller 112 to initiate an attach request or registration request procedure by transmitting an attach request or initial registration request message, wherein the initial attach request or initial registration request message comprising a registration status of the UE of a second Radio access technology to a core network of the first RAT.

The various actions, acts, blocks, steps, or the like in the flow diagram 500 may be performed in the order presented, in a different order or simultaneously. Further, in some embodiments, some of the actions, acts, blocks, steps, or the like may be omitted, added, modified, skipped, or the like without departing from the scope of the invention.

Figure 6A:
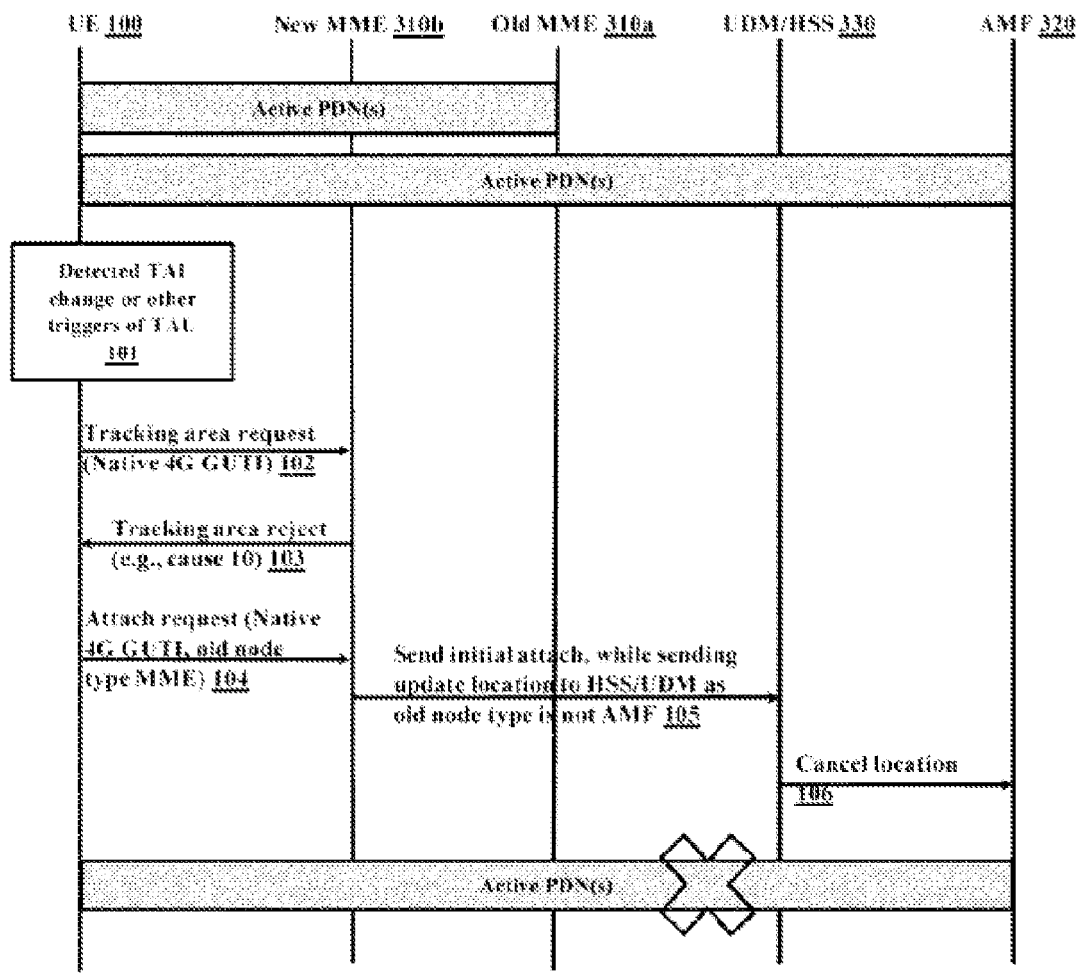
FIG. 6A is a sequence diagram illustrating a method of receiving a TAU failure message (e.g., temporary rejection) from the MME during mobility form one tracking area to another tracking area, according to a prior art.

FIG. 6A is a sequence diagram illustrating a method of receiving a registration failure message (e.g., temporary rejection) from the MME during registration, according to a prior art.

Figure 6B:
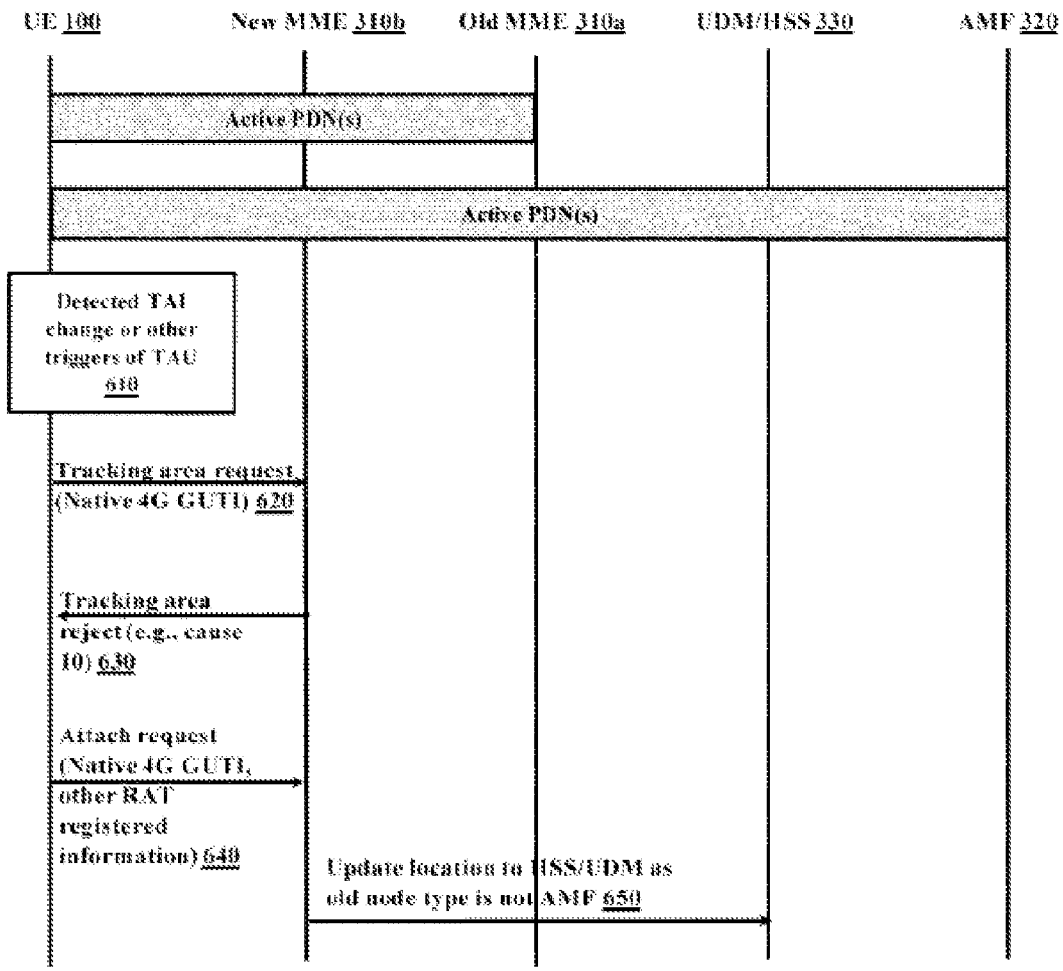
FIG. 6B is a sequence diagram illustrating a method of maintaining the service continuity by the UE in the wireless communication system, according to an embodiment as disclosed herein.

FIG. 6B is a sequence diagram illustrating a method of maintaining the service continuity by the UE 100 in the wireless communication system 1000, according to an embodiment as disclosed herein.

As shown in the FIG. 6B, the UE 100 is registered in the dual-mode registration, in which the UE 100 can access the 3GPP access network (such as 5G) and the non-3GPP access network (such as 5G WI-FI connection) using the old MME 310a. In an embodiment, if the UE 100 moves to a new tracking area within a 5G coverage area then, the UE 100 detects the change in the tracking area at step 610. In another embodiment, if the UE 100 moves to the new tracking area within the 5G coverage area then, the UE 100 and may receive a trigger of TAU at step 610. In response to the detection, the UE 100 sends a TAR attach request to a new MME 310b at step 620. Further, the new MME 310b may send a tracking area reject/implicit detach to the UE 100, in response to receiving the TAR attach request at step 630. As the 5G identity of the UE 100 is still valid, the UE 100 may send an attach request with a native 5G GUTI details to the new MME 310b at step 640. The attach request includes the GUTI value associated with the old MME 310a and other registered RAT information. The UE 100 may update a location to HSS/UDM 330 by Registration Request or Attach Request through AMF/MME 320 at step 650. Accordingly, the MME 310b may update a new location of the UE 100 based on a user-related and subscriber-related information from the HSS/UDM 330, as the UE 100 moves from one tracking area to the another tracking area.

In an embodiment, consider a scenario in which the UE 100 is registered in dual-mode registration, in which the UE 100 can access the 3GPP access network (such as 4G) and the non-3GPP access network (such as 5G WI-FI connection) using the old MME 310a. During initial registration itself, the UE 100 is configured to indicate on a given RAT (for e.g., 4G) that the UE 100 is also registered on alternate RAT (for e.g., 5G) to the new MME 310b. If the new MME 310b receives the information that the UE 100 is registered in the 5G/non-3GPP (e.g., an AMF) then, the new MME 310b may not include an initial attach indication towards the UDM/HSS 310. Further, the UDM/HSS 310 does not delete the PDUs of 5G connection/non-3GPP access network.

Figure 7:
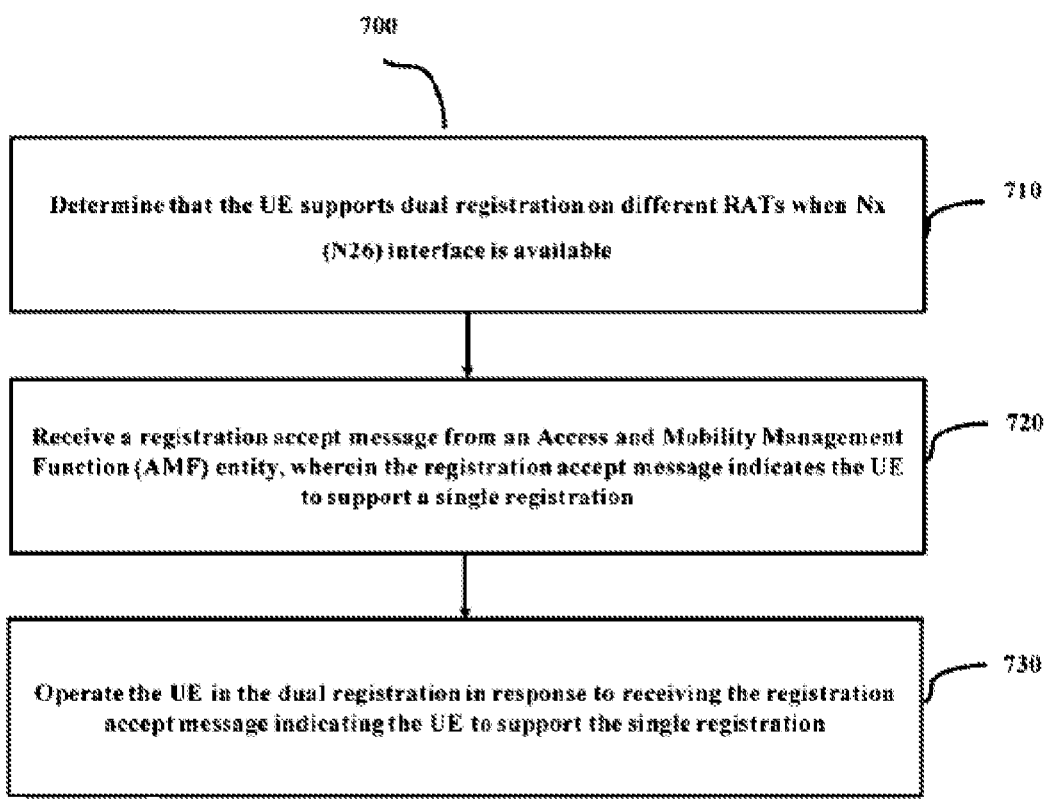
FIG. 7 is a flow diagram illustrating various operations for handling dual registration by the UE in the wireless communication system, according to an embodiment as disclosed herein.

FIG. 7 is a flow diagram 700 illustrating various operations for handling dual registration by the UE 100 in the wireless communication system 1000, according to an embodiment as disclosed herein.

At 710, the method includes determining that the UE 100 supports dual registration on different RATs when Nx (N26) interface is available. In an embodiment, the method allows registration engine 120 to determine that the UE 100 supports dual registration on different RATs when Nx (N26) interface is available.

At 720, the method includes receiving the registration accept message from an AMF entity, where the registration accept message indicates the UE to support the single registration. In an embodiment, the method allows registration engine 120 to receive the registration accept message from an AMF entity, where the registration accept message indicates the UE to support the single registration.

At 730, the method includes operating the UE 100 in the dual registration in response to receiving the registration accept message indicating the UE to support the single registration. In an embodiment, the method allows registration engine 120 to operate the UE 100 in the dual registration in response to receiving the registration accept message indicating the UE to support the single registration.

Figure 8A:
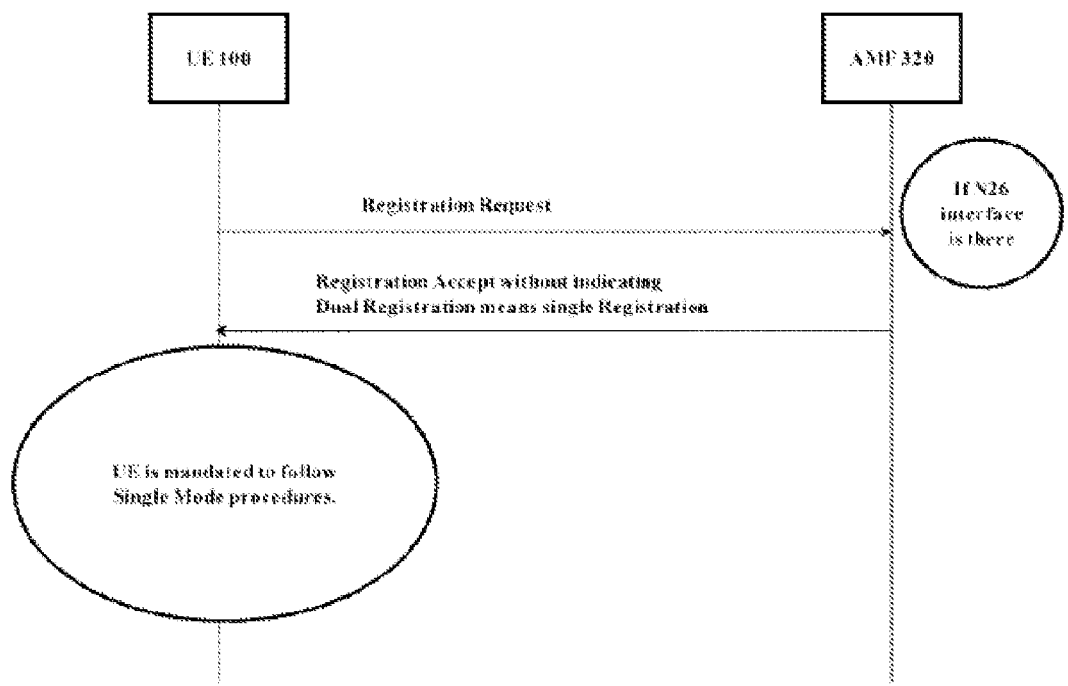
FIG. 8A is a scenario of registration accept without indicating dual registration, according to prior art.

FIG. 8A is a scenario of registration accept without indicating dual registration, according to prior art.

As shown in the FIG. 8A, at 1, the UE 100 sends the registration request to the AMF 320. If N26 interface is there and the AMF 320 sends the registration accept without indicating dual registration to the UE 100 and the UE 100 is mandated to follow single mode procedures at 2.

Figure 8B:
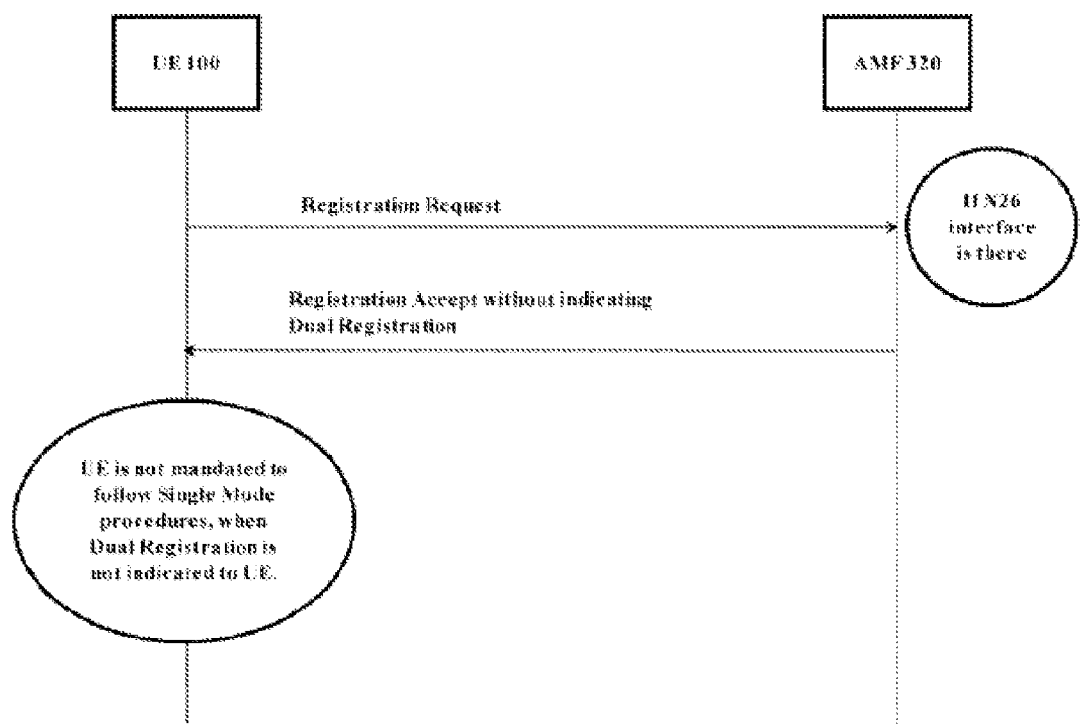
FIG. 8B is a scenario of registration accept without indicating dual registration, according to an embodiment as disclosed herein.

FIG. 8B is a scenario of registration accepts without indicating dual registration, according to an embodiment as disclosed herein.

As shown in the FIG. 8B, at 1, the UE 100 sends the registration request to the AMF 320. If N26 interface is there and the AMF 320 sends the registration accept without indicating dual registration to the UE 100. Further, the registration engine 120 allows the UE 100 to obviate mandated the use of single registration when the dual registration is not indicated to the UE 100. Further, the dual registration can be used with the dual radio case even when the single registration is supported by the network.

Figure 9:
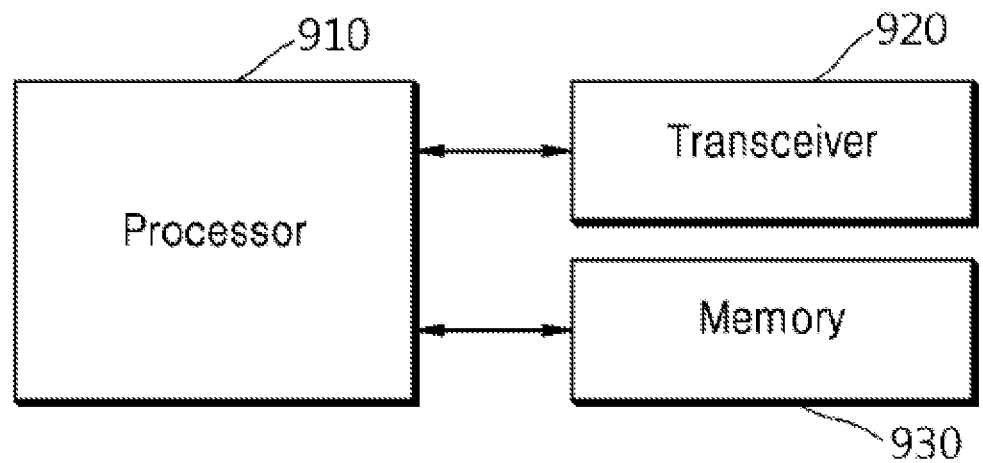
FIG. 9 is a block diagram illustrating the structure of a user equipment according to another embodiment of the present disclosure.

FIG. 9 is a block diagram illustrating the structure of a user equipment according to another embodiment of the present disclosure.

Referring to the FIG. 9, the user equipment 900 may include a processor 910, a transceiver 920 and a memory 930. However, all of the illustrated components are not essential. The user equipment 900 may be implemented by more or less components than those illustrated in FIG. 9. In addition, the processor 910 and the transceiver 920 and the memory 930 may be implemented as a single chip according to another embodiment. The processor 910 may correspond to a Processor 150 of FIG. 3. The transceiver 920 may correspond to a Communicator 130 of FIG. 3. The memory 930 may correspond to Memory 140.

The aforementioned components will now be described in detail.

The processor 910 may include one or more processors or other processing devices that control the proposed function, process, and/or method. Operation of the user equipment 900 may be implemented by the processor 910.

The processor 910 may sense each configured resource pool and/or each group of resources to obtain a result of sensing, the result of sensing containing a set of remaining candidate single TU resources of each resource pool. The processor 910 may select, from the set of remaining candidate single TU resources of each resource pool and/or each group of resources, one candidate single TU resource as a transmission resource.

The transceiver 920 may include a RF transmitter for up-converting and amplifying a transmitted signal, and a RF receiver for down-converting a frequency of a received signal. However, according to another embodiment, the transceiver 920 may be implemented by more or less components than those illustrated in components.

The transceiver 920 may be connected to the processor 910 and transmit and/or receive a signal. The signal may include control information and data. In addition, the transceiver 920 may receive the signal through a wireless channel and output the signal to the processor 910. The transceiver 920 may transmit a signal output from the processor 1910 through the wireless channel.

The memory 930 may store the control information or the data included in a signal obtained by the device 900. The memory 930 may be connected to the processor 910 and store at least one instruction or a protocol or a parameter for the proposed function, process, and/or method. The memory 930 may include read-only memory (ROM) and/or random access memory (RAM) and/or hard disk and/or CD-ROM and/or DVD and/or other storage devices.

Figure 10:
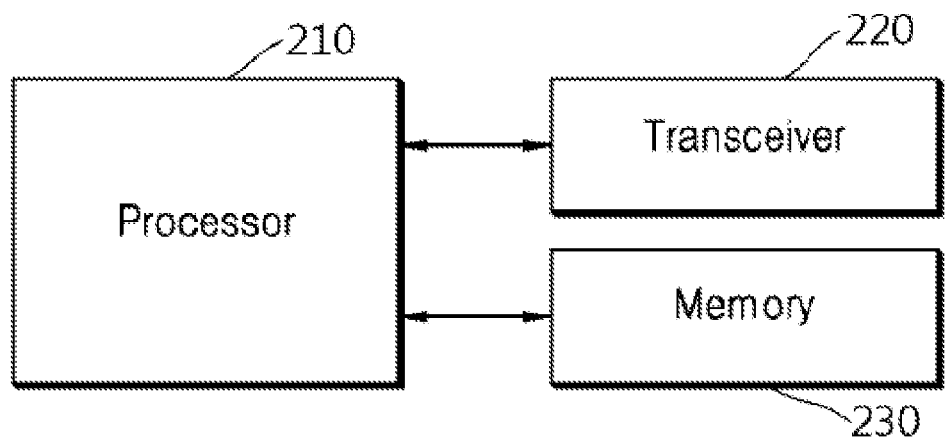
FIG. 10 is a block diagram illustrating the structure of a base station according to another embodiment of the present disclosure.

FIG. 10 is a block diagram illustrating the structure of a base station according to another embodiment of the present disclosure.

Referring to the FIG. 10, the base station 200 may include a processor 210, a transceiver 220 and a memory 230. However, all of the illustrated components are not essential. The base station 200 may be implemented by more or less components than those illustrated in FIG. 10. In addition, the processor 210 and the transceiver 220 and the memory 230 may be implemented as a single chip according to another embodiment.

The aforementioned components will now be described in detail.

The processor 210 may include one or more processors or other processing devices that control the proposed function, process, and/or method. Operation of the base station 200 may be implemented by the processor 210.

The processor 210 may determine the locations of transmission resources and reception resources.

The transceiver 220 may include a RF transmitter for up-converting and amplifying a transmitted signal, and a RF receiver for down-converting a frequency of a received signal. However, according to another embodiment, the transceiver 220 may be implemented by more or less components than those illustrated in components.

The transceiver 220 may be connected to the processor 210 and transmit and/or receive a signal. The signal may include control information and data. In addition, the transceiver 220 may receive the signal through a wireless channel and output the signal to the processor 210. The transceiver 220 may transmit a signal output from the processor 210 through the wireless channel.

The memory 230 may store the control information or the data included in a signal obtained by the base station 200. The memory 230 may be connected to the processor 210 and store at least one instruction or a protocol or a parameter for the proposed function, process, and/or method. The memory 230 may include read-only memory (ROM) and/or random access memory (RAM) and/or hard disk and/or CD-ROM and/or DVD and/or other storage devices.

The embodiments disclosed herein can be implemented through at least one software program running on at least one hardware device and performing network management functions to control the elements. The elements shown in the FIG. 2 to FIG. 5, FIG. 6B to FIG. 7, FIG. 8B, FIG. 9 and FIG. 10 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While the disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method performed by a user equipment (UE) for maintaining service continuity in a wireless communication system, the method comprising:
   transmitting a registration request message or a tracking area update (TAU) message to a management entity of a first radio access technology (RAT) network, when the UE is registered in the first RAT network and a second RAT network;
   receiving, from the management entity, a registration reject message or a TAU reject message; and
   transmitting, to the management entity, a registration message for initial registration or an attach request message including a registration status information of the UE of the second RAT network,
   wherein the registration status information of the UE of the second RAT network comprises at least one of Evolved Packet System (EPS) Mobility Management, (EMM) registration status information, or $5^{th}$ Generation Mobility Management (5GMM) registration status information.

2. The method of claim 1, wherein the first RAT network comprises a Long Term Evolution (LTE) network or a New Radio (NR) network,
   wherein the second RAT network comprises the LTE network or the NR network, and
   wherein the first RAT network and the second RAT network are different.

3. The method of claim 2, wherein the management entity comprises an Access and Mobility Management Function (AMF), if the first RAT network is the NR network, and a Mobility Management Entity (MME), if the first RAT network is the LTE network.

4. The method of claim 1, wherein the UE operates in a dual registration mode.

5. The method of claim 1, further comprising detecting a change of a tracking area within the first RAT network.

6. A method performed by a management entity of a first Radio Access Technology (RAT) network, the method comprising:
   receiving, by a management entity of the first RAT network, a registration request message or a tracking area update (TAU) message, from a user equipment (UE);
   transmitting, by the management entity, a registration reject message or a TAU reject message, to the UE; and
   receiving, by the management entity, a registration message for initial registration or an attach request message including a registration status information of the UE of a second RAT network, from the UE,
   wherein the registration status information of the UE of the second RAT network comprises at least one of Evolved Packet System (EPS) Mobility Management, (EMM) registration status information, or $5^{th}$ Generation Mobility Management (5GMM) registration status information.

7. The method of claim 6, wherein the first RAT network comprises a Long Term Evolution (LTE) network or a New Radio (NR) network,
   wherein the second RAT network comprises the LTE network or the NR network, and
   wherein the first RAT network and the second RAT network are different.

8. The method of claim 6, wherein the UE operates in a dual registration mode.

9. The method of claim 6, wherein the registration request message or a TAU message is received when a change of a tracking area within the first RAT network is detected by the UE.

10. The method of claim 6, further comprising transmitting information indicating not to delete a registration information of the second RAT network, to at least one of a Home Subscriber Server (HSS) or Unified Data Management (UDM).

11. A user equipment (UE) in a wireless communication system, the UE comprising:
a transceiver; and
at least one controller coupled with the transceiver and configured to:
transmit a registration request message or a tracking area update (TAU) message to a management entity of a first radio access technology (RAT) network, when the UE is registered in the first RAT network and a second RAT network,
receive a registration reject message or a TAU reject message, and
transmit a registration message for initial registration or an attach request message including a registration status information of the UE of the second RAT network,
wherein the registration status information of the UE of the second RAT network comprises at least one of Evolved Packet System (EPS) Mobility Management, (EMM) registration status information, or $5^{th}$ Generation Mobility Management (5GMM) registration status information.

12. The UE of claim 11, wherein the EMM registration status information includes at least one of information indicating the UE is not in an EMM-REGISTERED state or information indicating the UE is in the EMM-REGISTERED state, and
wherein the 5GMM registration status information includes at least one of information indicating the UE is not in a 5GMM-REGISTERED state or information indicating the UE is in the 5GMM-REGISTERED state.

13. The UE of claim 11, wherein the UE operates in a dual registration mode.

14. A management entity of a first Radio Access Technology (RAT) network, the management entity comprising:
a transceiver; and
at least one controller coupled with the transceiver and configured to:
receive a registration request message or a tracking area update (TAU) message, from a user equipment (UE),
transmit a registration reject message or a TAU reject message, to the UE, and
receive a registration message for initial registration or an attach request message including a registration status information of the UE of a second RAT network, from the UE,
wherein the registration status information of the UE of the second RAT network comprises at least one of Evolved Packet System (EPS) Mobility Management, (EMM) registration status information, or $5^{th}$ Generation Mobility Management (5GMM) registration status information.

15. The management entity of claim 14, wherein the first RAT network comprises a Long Term Evolution (LTE) network or a New Radio (NR) network,
wherein the second RAT network comprises the LTE network or the NR network, and
wherein the first RAT network and the second RAT network are different.

16. The management entity of claim 14, wherein the at least one controller is further configured to transmit information indicating not to delete a registration information of the second RAT network, to at least one of a Home Subscriber Server (HSS) or Unified Data Management (UDM).

* * * * *